April 26, 1949.    T. D. GREEN    2,468,663
ARTICLE ILLUMINATING INSPECTION DEVICE FOR AMBER
GLASS INSULATORS AND OTHER HOLLOW DENSE
WALLED ARTICLES OF LOW TRANSPARENCY
Filed Aug. 11, 1945    3 Sheets-Sheet 1
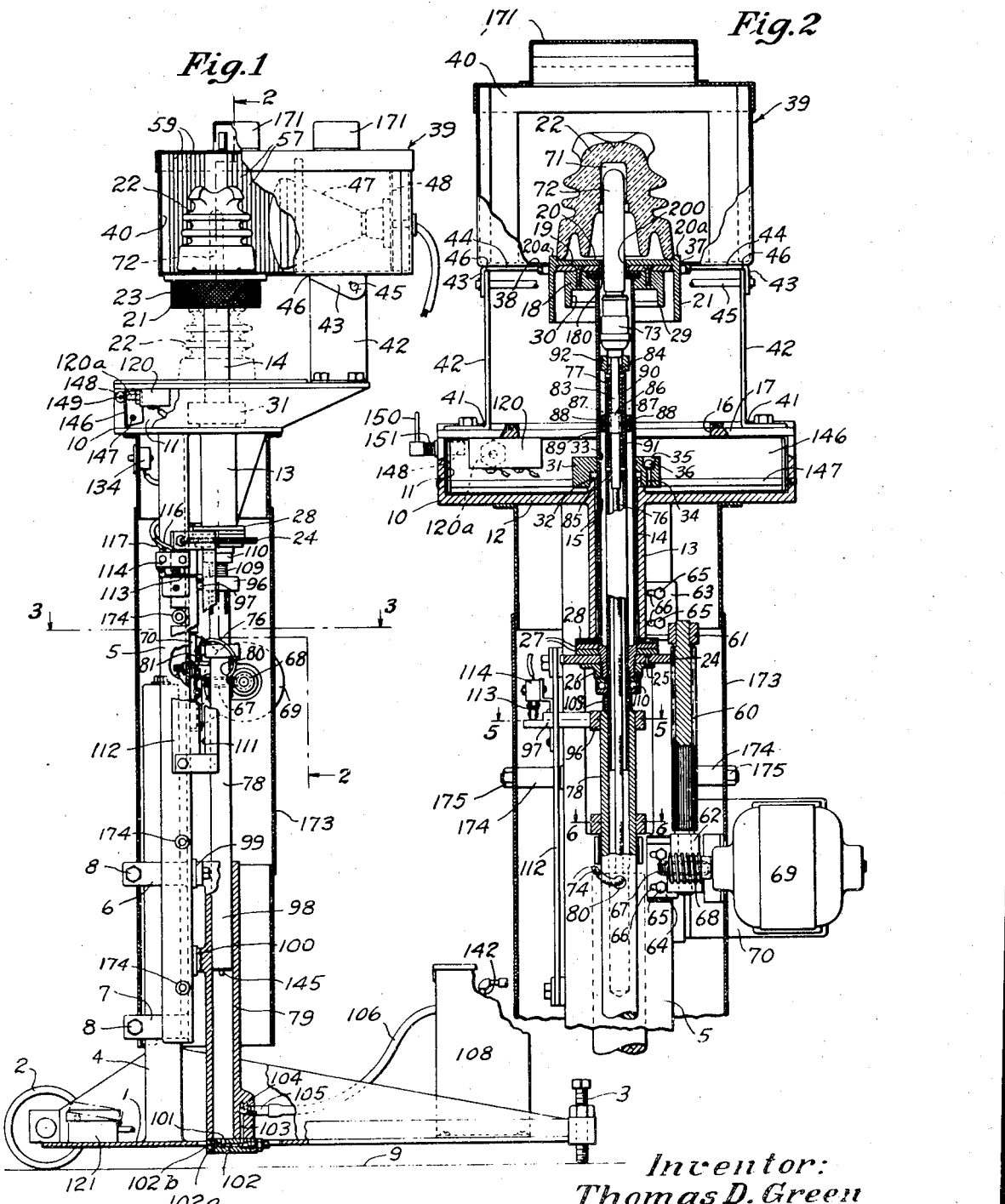
Inventor:
Thomas D. Green
by Lloyd G. Bates
Attorney
Witness:
A. A. Horn April 26, 1949.　　　　T. D. GREEN　　　　2,468,663
ARTICLE ILLUMINATING INSPECTION DEVICE FOR AMBER
GLASS INSULATORS AND OTHER HOLLOW DENSE
WALLED ARTICLES OF LOW TRANSPARENCY
Filed Aug. 11, 1945　　　　　　　　　　　3 Sheets-Sheet 2
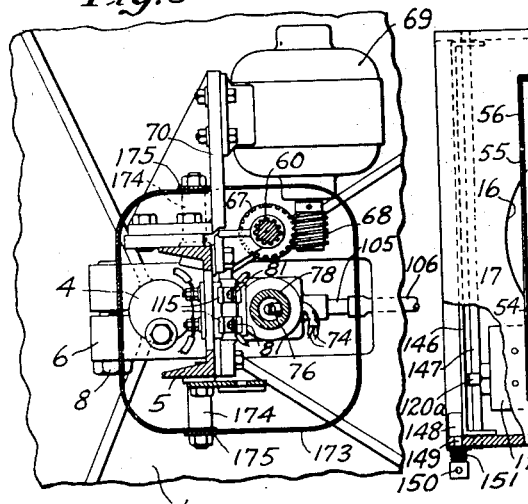
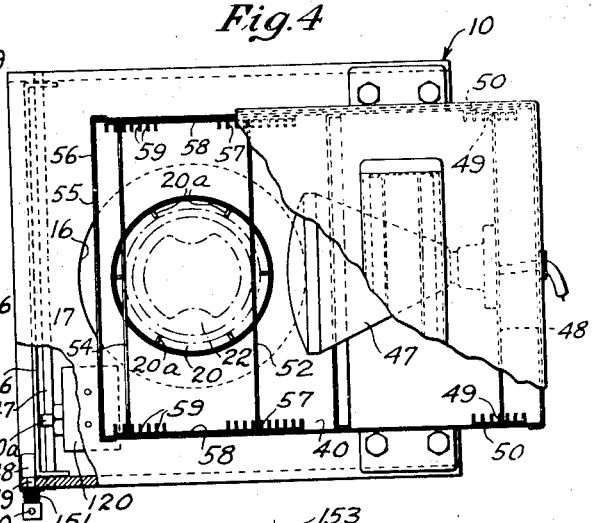
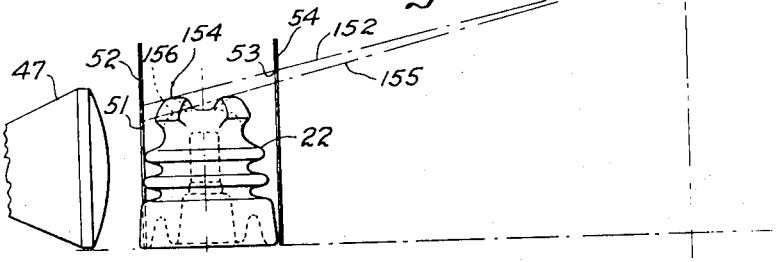
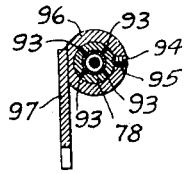
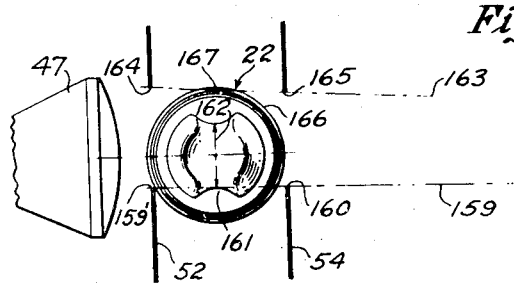
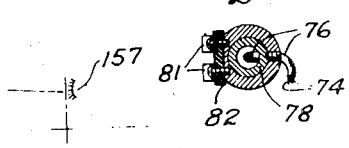
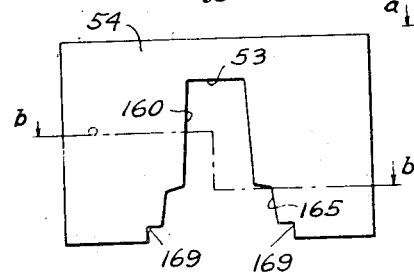
Inventor:
Thomas D. Green
by Lloyd G. Bates
Attorney.
Witness:
A. A. Horn April 26, 1949. T. D. GREEN 2,468,663
ARTICLE ILLUMINATING INSPECTION DEVICE FOR AMBER
GLASS INSULATORS AND OTHER HOLLOW DENSE
WALLED ARTICLES OF LOW TRANSPARENCY
Filed Aug. 11, 1945 3 Sheets-Sheet 3
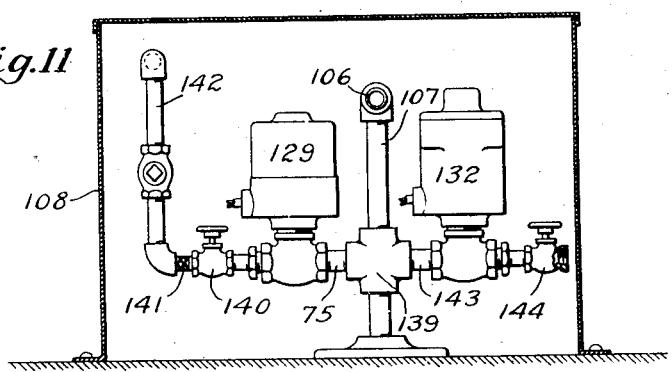
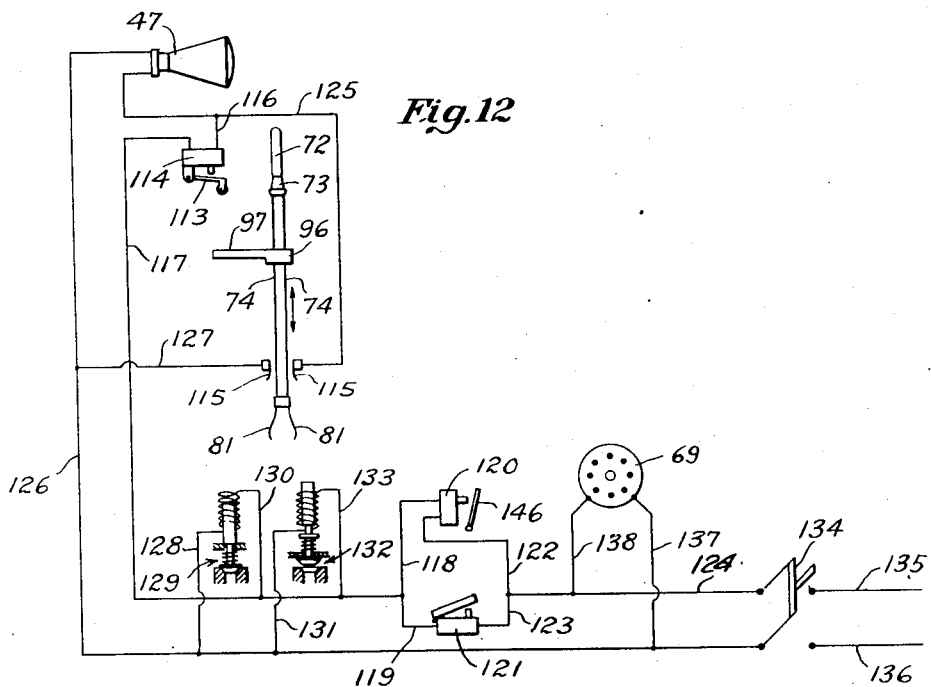
Witness:
A. A. Horn
Inventor:
Thomas D. Green
by Lloyd G. Bates
Attorney.

Patented Apr. 26, 1949

2,468,663

UNITED STATES PATENT OFFICE 2,468,663

ARTICLE ILLUMINATING INSPECTION DEVICE FOR AMBER GLASS INSULATORS AND OTHER HOLLOW DENSE WALLED ARTICLES OF LOW TRANSPARENCY

Thomas D. Green, West Hartford, Conn., assignor to Hartford-Empire Company, Hartford, Conn., a corporation of Delaware Application August 11, 1945, Serial No. 610,293

11 Claims. (Cl. 88—14)

This invention relates to improvements in devices for facilitating the inspection of glass articles.

An object of the invention is to provide an inspection device which will greatly facilitate and aid inspection of dense glass articles having bodies or walls of low transparency, such, for example, as amber glass insulators, in which certain defects, such as stones and defective threads, checks, etc., cannot be readily detected by visual examination under usual conditions.

Another object of the invention is to provide for adequate illumination of the glass article undergoing inspection while preventing rays of light from the light source from reaching the eyes of the observer directly, thereby providing the observer with a good view of the glass mass of the body or wall of the article without subjecting the eyes of the observer to glare.

A further object of the invention is to provide a glass article inspection device which will afford facilities for presenting each glass article to be inspected at an inspection station at which the article will be thoroughly illuminated and will be wholly in the view of the observer and at the same time be so supported that it can be readily and quickly removed and replaced by the next article to be inspected.

A further object of the invention is to provide a glass article inspection device of the character described which can be readily adjusted and adapted for effective use in the inspection of dense glass articles of different sizes and shapes at different times.

A further object of the invention is to provide a glass article inspection device of the character described which can be operated readily by the observer of the article undergoing inspection without interfering with thorough visual examination of the article by the same observer.

Other objects and advantages of the invention hereinafter will be pointed out or will become apparent from the following description of a practical embodiment thereof, as shown in the accompanying drawings, in which Figure 1 is a view, mainly in side elevation, with parts broken away and other parts shown in vertical section, showing my improved inspection device as used for the inspection of a glass insulator, such insulator being shown in full lines at the inspection station and in dot-and-dash lines at a lower loading station;

Fig. 2 is a relatively enlarged view, mainly in vertical section, of the upper portion of the inspection device as it appears when viewed from a vertical plane extending at right angles to Fig. 1;

Fig. 3 is a relatively enlarged horizontal section substantially along the line 3—3 of Fig. 1;

Fig. 4 is a relatively enlarged top plan view of the device, with upper portions of the device partially broken away to reveal underlying structure;

Fig. 5 is a section substantially along the line 5—5 of Fig. 2, showing details of a piston rod that is included in the device;

Fig. 6 is another detail sectional view, taken substantially along the line 6—6 of Fig. 2;

Fig. 7 is a diagrammatic side elevational view, showing the manner in which light shields of the device permit a view of a glass insulator throughout its full height without glare on the eyes of the observer, the light shields being shown in vertical section;

Fig. 8 is a diagrammatic plan view which illustrates how the light shields prevent light rays from the source reaching the eyes of the observer without passing through glass of the insulator, the rear light shield being shown in section along the line a—a of Fig. 10 and the front light shield being shown in section along the line b—b of Fig. 9;

Fig. 9 is a face view of the front light shield, showing a suitable aperture therein for the glass insulator of Figs. 7 and 8;

Fig. 10 is a view similar to Fig. 9 but showing the rear light shield;

Fig. 11 is a relatively enlarged view, showing pressure fluid supply and exhaust lines and their controls, within a housing therefor, the latter being shown in section; and Fig. 12 is a diagram of the connections and control parts of the electrical equipment of the inspection device.

A dense glass article, such as an amber glass insulator, may have defects, such as stones, checks, etc. in the walls thereof which render such articles unfit for their intended use or at least of doubtful utility. Since the glass of such an insulator is of low transparency, an observer may fail to detect such a defect therein when the article is inspected under conditions such as usually exist at the place of inspection. With the inadequate light and inspection facilities available to an inspector prior to the present invention, much time and care of an inspector of such dense articles as amber glass insulators were required.

The present invention greatly improves the situation so far as the inspection of amber glass insulators or other dense glass articles is concerned by providing intense illumination of the article and a good view of all portions thereof so that the inspector may determine quickly whether or not the article contains stones or other defects in its internal mass. The invention also provides article supporting and article moving structure of such a character that each such article may be handled and inspected quickly, whereby a large number of articles may be individually handled and inspected in rapid succession by a single inspector.

As shown in the accompanying drawings, an illustrative device embodying the invention comprises a base 1, Fig. 1, supported at its front on wheels, one of which is shown at 2, and at its rear on jack screws, one of which is shown at 3. This base carries a sectional upright supporting member or standard, comprising a fixed lower part, in the form of a vertical post 4 uprising from and integral with the base 1, and a vertically adjustable upper part, shown as a vertically disposed channel member 5, the lower portion of which overlaps the post 4 and is adjustably secured thereto by the clamping brackets 6 and 7. These, as shown for the clamping bracket 6 in Fig. 3, may be of the split collar type, the sections of the clamping collar being fastened by a cap bolt 8. By loosening the cap bolts of these clamping brackets, the upper part 5 of the vertical supporting standard of the device may be raised or lowered to adjust vertically in relation to a supporting floor 9, Fig. 1, the level of the parts carried by the upper part of the standard.

The upright channel member 5 carries an article loading table 10, Figs. 1, 2 and 4, which may be fastened thereto at its upper end by welding, or in any other suitable known way. The article loading table 10 may be a box-like structure having a chamber 11 therein to accommodate certain parts of the device as hereinafter will be explained. The bottom of this box-like structure is designated 12 in Fig. 2 and is there shown as having an integral depending tubular extension 13. This serves as a vertical guide and bearing housing for a vertically movable, rotatable tubular spindle 14. The tubular spindle 14 extends through the bore of the tubular member 13 and through a vertical opening 15 in the bottom 12 of the box-like structure 10 and through a relatively large central aperture 16 in its top 17 to a level substantially above the latter when the spindle is in its raised position as shown in Figs. 1 and 2. The spindle 14, which is reciprocated vertically in its guide and relative to the table 10 in a manner and by means presently to be described, is provided at its upper end with a head structure 18 having a flat upper surface 19, Fig. 2.

An article supporting cap comprises a top or head portion 20 adapted to rest flatwise upon the flat upper surface 19 of the head structure 18 and a depending skirt 21 extending downwardly around and below the level of such head structure, as best seen in Fig. 2. This article supporting cap may be made of aluminum or any other suitable light metal or material, and it is designed to serve as a stand or rest for a glass insulator 22 or the like. The skirt 21 of the article supporting cap may have its outer surface knurled or roughened, as indicated at 23 in Fig. 1, for frictional engagement with the thumb or finger of an operator of the inspection device for a purpose to be presently stated. The top 20 of the cap may have a circular series of article-centering lugs or upward projections 20a thereon, Figs. 2 and 4. Both the head structure 18 and the top 20 of the article supporting cap are centrally apertured at 18a and 20a, respectively, Fig. 2, for a purpose to be presently pointed out.

The tubular spindle 14 has a spur gear 24 mounted on its lower end portion, as by being fastened at 25 to a nut 26 on the extreme lower end portion of the spindle. Above the spur gear 24, the spindle may carry one or more (two in the example shown) metal washers 27 surmounted by a bumper washer 28 of leather or other shock-cushioning material. Thus, when the spindle is raised to the upper limit of its vertical stroke, as to the position shown in Figs. 1 and 2, it will be brought to a cushioned stop by contact of the leather washer 28 with the lower end of the stationary tubular guide 13.

The return or downward movement of the spindle is cushioned at the end thereof by an air cushion which may be created in the following manner. The head structure 18 on the spindle is provided with a depending flange 29, Fig. 2, thereby defining an open-bottomed chamber 30 in such structure. A bottom closure for this chamber is provided by a cap 31 on an upstanding tubular boss 32 surrounding the opening 15 in the bottom wall 12 of the article loading table 10. This cap has a central aperture 33 through which the tubular spindle slidably extends. The cap 31 is of suitable external configuration and size in cross section to fit closely, although slidably, within the lower portion of the open-bottomed chamber 30 when the head 18 on the spindle has moved downward to position to fit over such closure cap. The air thus confined between the walls of the chamber 30 in the head 18 and the cap 31 will bring the spindle to a cushioned stop at the end of its downward stroke while the air escapes by leakage between the parts. A vertical opening 34, having an enlarged upper end portion 35 for the reception of a ball valve 36, will permit entrance of air so that the spindle will not be detained in its upward motion by formation of a vacuum in the chamber 30.

When the spindle is at the upper end of its stroke, as shown in Figs. 1 and 2, the article supporting cap thereon will project into, and its top may be slightly above, an aperture 37 in the bottom 38 of a box-like structure 39. The walls of this structure define a chamber 40, Figs. 1, 2 and 4, in which the article undergoing inspection is supported, rotated and illuminated. The structure 39 therefore may be termed an "article inspection box" and its chamber an "article inspection chamber." The inspection box 39 is pivotally mounted on the stationary loading table so that it may be swung from its active position over the loading table upwardly and rearwardly to an out-of-the-way position, when desired. As shown, Fig. 2, the top 17 of the article loading table 10 carries transversely spaced angle brackets 41 on its rear portion, these brackets having parallel upstanding arms 42 to which depending arms 43 of brackets 44 on the rear portion of the bottom of the inspection box 39 are hingedly connected by a transversely extending hinge pin or rod 45. See Fig. 1 also. The inspection box 39 will be prevented from moving downwardly about the axis of the hinge pin 45 beyond the horizontal position shown in Figs. 1 and 2 by the contact of the bottom of such box with the upper edge 46 of the upright bracket arms 42.

The inspection box 39 houses an external light source 47 for casting light upon the insulator when the latter has been raised to its inspection position within the inspection chamber. As shown, this light source, which may be a large flood lamp known in the trade as a 120 v., 150 w., R40 flood light, is mounted on an attaching plate 48 which, as best seen in Fig. 4, extends across the rear part of the chamber 40 and is retained in place by the engagement of its vertical side edge portions with any selected pair of transversely aligned vertical grooves 49 in attaching members 50 on the side walls of the inspection box 39. By this arrangement, light from the source 47 will pass through an aperture 51 in a rear light shield 52 to the insulator 22, through the glass of the latter, and thence through the aperture 53 in a front light shield 54 and an aperture 55 in the front wall 56 of the inspection box to the eyes of an observer at the front of such box. The rear light shield 52 is positioned appropriately in respect to the insulator by the engagement of its side edge portions with a selected pair of transversely aligned vertical grooves 57 in side attaching plates 58 on the side walls of the inspection box. The front light shield 54 similarly is positioned in an appropriate position in respect to the insulator by the engagement of its side edge portions with transversely aligned vertical grooves 59 in more forward portions of these attaching plates.

The distance of the rear shield behind the vertical center line of the insulator should be as small as possible in order to provide the largest angular aperture as seen from the insulator center. Diminution of this angle darkens the view of the insulator toward its edges. The distance of the front shield in front of the center line of the insulator also should be as small as possible to allow a maximum portion of the view of the insulator to be common to both eyes of the observer.

The glass article in the inspection chamber 40 is rotated in the illuminated field by rotation of the tubular spindle 14 about its vertical axis. As hereinbefore has been pointed out, this spindle carries a spur gear 24 which is in mesh with a vertically disposed pinion 60. The upper and lower end portions of the latter are journaled in bearings 61 and 62, respectively, on brackets 63 and 64, respectively, attached to the vertical channel member 5. As shown, the brackets 63 and 64 are attached to the channel member by cap bolts 65 extending through horizontal slots 66 in the brackets so that the pinion may be shifted laterally within limits toward or away from the axial line of the hollow spindle. This permits selective use of different driving pinions with the same or with different spur gears on the tubular spindle so as to change the speed of rotation of the spindle about its vertical axis. The pinion is driven by a driven connection through a worm wheel 67, Figs. 1, 2 and 3, with a worm 68 on the driving shaft of an electric motor 69. The latter is carried by a bracket 70 on the upright channel member 5.

The invention also provides for illumination of the insulator in the inspection chamber by light from a light source in the internal space or socket 71 of the insulator. The inner light source, indicated at 72, Figs. 1 and 12, may be an electric lamp known in the trade as T-6½, 25 w., 120 v., frosted bulb, having a conventional base which fits into a conventional socket 73, Figs. 2 and 12. This socket is provided with electrically conducting wires 74, Figs. 2, 6 and 12, which may be encased in a sheath 76, Figs. 2 and 6. As shown in Fig. 2, this sheath may extend downwardly from the socket through the bore of a tubular upper section 77 of a vertical piston rod into and part way through a tubular lower section 78 of the same piston rod. This piston rod lower section 78 projects upwardly from a vertically disposed cylinder 79. The sheath 76 emerges from the bore of the tubular piston rod section 78 through an aperture 80 in the side of the piston rod section 78, Figs. 1 and 2, the wires 74 thereafter being attached to spaced contacts 81 which are fastened to and insulated from the piston rod in a conventional manner, as indicated at 82 in Fig. 6.

In the upper part of the piston rod upper section 77, the sheath or cable 76 passes through a short rigid tubular casing or sleeve 83, Fig. 2, on which the inner lamp socket 73 is mounted. This casing or sleeve may move a short distance up or down, its opposite end portions sliding in vertically spaced short fixed bushings 84 and 85, respectively, in the piston rod upper section. Intermediate its length, the tubular casing or sleeve 83 is formed with a slight external enlargement 86 provided at its opposite sides with vertical grooves 87 in which work the inner ends of pins 88 carried by a collar 89 on the piston rod section 77 and projecting through walls of the latter. Coil springs 90 and 91 surround the casing or sleeve 83 between the upper fixed bushing 84 and the intermediate enlargement and between such intermediate enlargement and the lower fixed bushing 85, respectively. These springs are compressed sufficiently to exert sufficient pressure on the sleeve 83 to stabilize the position of the cable 76, the lamp socket 73 and its supported lamp 72 as a unit, relative to the piston rod when the latter is at rest and to permit slight overtravel of such unit while cushioning the lamp against shock at the ends of the upward and downward strokes of the piston rod. The upper section of the tubular piston rod may be externally enlarged at its upper end, as at 92, so as to fit within the tubular spindle closely enough to prevent any substantial lateral play between the piston rod and the tubular spindle.

The upper section 77 depends within the lower section 78 of the tubular piston rod to an extent which may be varied to adjust the overall length of such piston rod. As shown in Fig. 5, the lower section 78 of the piston rod is slit vertically from its upper end for part of its length in four places, as indicated at 93. A set screw 94 may be screwed through an opening 95 in the wall of a collar 96 on the piston rod section 78 against one of the sections of the latter between adjacent vertical slits 93, so as to tighten the slit overlapping portion of the lower piston rod section against the enclosed portion of the upper piston rod section to maintain the adjusted relationship of these sections. The collar 96 carries a laterally projecting arm 97 which may have been welded or otherwise fastened thereto and which has a function hereinafter to be described.

The lower section 78 of the piston rod is continuous with a piston 98 in the vertical cylinder 79. The latter may be attached by the brackets 99 and 100, Fig. 1, to the upright supporting channel member 5. A pressure fluid intake and exhaust opening 101 in the bottom of the cylinder 79 communicates with a horizontal passage 102 in the bottom head of the cylinder. The passage 102 communicates with a vertical passage 103 in an enlarged side wall portion of the cylinder. The passage 103 has a port 104 which may be provided with a nipple 105. A flexible pipe or tubing 106 is attached to the nipple and may lead to and be operatively connected with an upright pipe 107 in a housing or box 108 on the base 1. See Fig. 11.

When air under pressure is supplied through the connected fluid conducting parts just enumerated to the lower portion of the cylinder 79, the piston 98 will be raised, thereby lifting the piston rod and the inner light 72. After part of the upward stroke of the piston rod has taken place, further upward movement thereof will raise the tubular spindle so as to lift the supported article on the spindle head into the inspection chamber 40. The upward motion of the piston rod during the final part of its stroke is communicated to the tubular spindle through a coil spring 109, Figs. 1 and 2, on the piston rod between the collar 96 and a thrust bearing unit 110. The latter encircles the piston rod so as to rest on the spring 109 directly beneath the nut 26 by which the spur gear 24 is retained in place on the lower end portion of the tubular spindle.

When the piston rod approaches its upper limit, the arm 97 on the collar 96, which of course moves with the piston rod and which works in a vertical slot 111, Fig. 1, in a guide plate 112, Figs. 1 and 2, will strike a pivoted operating arm 113 of a normally open switch 114, Figs. 1, 2 and 12, and will close the latter. At the same time, the contacts 81, which are carried by the piston rod, will be moved into contact with a pair of stationary contacts 115. These are suitably mounted on a portion of the upright channel frame member 5, as best shown in Fig. 3. The arm 97 also prevents turning of the piston rod, insuring registration between contacts 81 and 115.

The switch 114 is provided with electrical conducting wires 116 and 117, respectively. As shown in Fig. 12, the wire 117 terminates in two branches 118 and 119, respectively, leading to a hand-operable, normally open, switch 120 and a foot-operable, also normally open, switch 121. The opposite sides of these switches 120 and 121, respectively, are connected by wires 122 and 123, respectively, with a wire 124.

The wire 116 is connected to a wire 125, one end of which is connected to one side of the outer lamp 47. The other end of the wire 125 is connected to one of the stationary contacts 115. The other side of the lamp 47 is provided with an electrical wire 126. A branch 127 of this wire 126 leads to the second stationary contact 115. Another branch 128 of the wire 126 leads to one side of a normally closed solenoid valve 129, the opposite side of which is connected by a wire 130 with the wire 117. A still further branch 131 of the wire 126 is connected with one side of a normally open solenoid valve 132. The opposite side of that solenoid valve is operatively connected by a wire 133 with the wire 117. The wires 126 and 124 may be operatively connected by a double pole, single throw switch 134 with electric mains 135 and 136 which may lead to any suitable source of electric current supply. Wires 137 and 138, respectively, lead from the wires 126 and 124 to the motor 69.

As shown in Fig. 11, the solenoid valve 129 is operatively connected by a nipple 75 with a pipe fitting 139, with which the aforesaid pipe 107 also is operatively connected. A manually operable throttle valve 140 and a restricted orifice nipple 141, in the order named, are provided in a pressure fluid supply line 142 by which the solenoid valve 129 is operatively connected with a source of pressure fluid supply (not shown). When the pressure fluid is compressed air, as at 30 lbs. per sq. inch, for example, the bore of the nipple 141 may be of small size, as about .052 of an inch. The size of this bore will determine the maximum speed of lift of the piston rod, and, hence of the supported article, the minimum speed of lift being determined by the adjustment of the throttle valve 140. The solenoid valve 132 is located at the opposite side of the fitting 139 from the solenoid valve 129 in an exhaust line 143. This exhaust line, which is open at its extremity, is provided with a manual throttle valve 144 for determining the minimum rate of exhaust of air from the bottom of a cylinder and hence the rate of downward movement of the piston rod and its supported article. The maximum rate of downward movement of these parts will be determined by the opening at the extremity of the exhaust line. It may be noted in this connection that a depending pin or integral plug 145 on the bottom of the piston 98 will enter the port 101 in the bottom of the cylinder just before the piston reaches the bottom wall of the cylinder so as to cushion the final part of the piston's downward stroke.

Initially, to start the piston on its upward stroke, air enters the cylinder chamber from the passage 102 through a by-pass opening 102—a, controlled by an upwardly opening ball check valve 102—b. As soon as the pin or plug 145 of the piston has been raised from the port 101, air will enter the cylinder mainly through such port.

The foot-operable switch 121 is mounted on the base 1 in position to be conveniently operated by the foot of the inspector. See Fig. 1. The switch 120 is mounted in the chamber 11 within the box-like article loading table 10. See Figs. 1, 2, and 4. The front wall of this table may be a swingable bar 146 which is pivoted adjacent to its lower edge on a transverse rod 147 in working relation to the projecting operating plunger 120a of the switch 120. An eccentric 148 is carried by a short shaft 149, Fig. 1, extending through a side wall of the hollow table 10. When the eccentric is turned to one position, as may be done by the handle 150, it will bias the upper portion of the pivoted bar 146 inwardly against the switch plunger 120—a so as to close the switch. A compression spring 151 between the handle 150 and the adjacent wall of the hollow loading table tends to exert frictional pressure on the handle and the adjacent table wall sufficient to maintain the eccentric in any angularly adjusted position. Therefore, the switch may be left closed for the time required for inspection of an article in the inspection box.

The operation of the parts which have been described so far will be readily understood. With the piston rod at the lower limit of its stroke and assuming that the main control switch 134 has been closed, it will be apparent that the motor 69 will be operating and the downwardly retracted spindle 14 and the parts carried thereby will be rotating. An insulator to be inspected then may be placed on the supporting surface 19 of the article-supporting cap on the spindle head. At this time, a cycle of operations of the heretofore inactive parts of the device may be initiated by closing either the switch 120, which may be done by operating the handle 150 on the work loading table, or by closing the foot-operable switch 121. Thus, if the hands of the inspector are engaged, the foot-operable control switch may be operated. Closing of either the switch 120 or the switch 121 will energize the solenoid valves 129 and 132. The solenoid valve 129 is the pressure fluid intake control valve while the solenoid valve 132 is the exhaust control valve. The intake control valve will be opened to admit fluid under pressure to the bottom of the cylinder 79 while the exhaust control valve will be closed. The consequent upward movement of the piston 98 in the cylinder 79 will raise the piston rod and the inner light 72, carried thereby, to the interior of the hollow glass article on the spindle, and thereafter will move the spindle also upwardly to lift the glass article to its inspection position within the light box 39. As previously explained, the contacts 81 will be brought by the upward movement of the piston rod into operative engagement with the fixed contacts 115. The switch 114 also will be closed completing the circuit for energizing both lamps. The observer, whose eyes are located at a predetermined level and at a predetermined distance in front of the article in the inspection chamber may view all portions of such article quickly as the article is rotated in the illuminated field. If a more prolonged inspection of any particular portion of the rotating article is desired, rotation of the article may be stopped temporarily without stopping rotation of the spindle by pressure of the thumb or a finger against the knurled or roughened outer surface 23 of the skirt 21 on the article-supporting cap. The particular locations of the eyes of the observer in relation to the article undergoing inspection may, of course, vary according to the size and shape of the article, the height above the article supporting surface of the portion of the article being examined at any given time, individual characteristics of the observer, etc. Assuming that the eyes of an observer are 2½ inches apart and are normal, good inspection results may be obtained if the observer looks at an insulator from about 15 inches from the center of the insulator and at a level between about 3½ inches and 9 inches above the level of the insulator supporting surface.

When the inspection has been completed, it is only necessary to release the switch 120 or 121, whichever was utilized to initiate the above described operations. This will cut off light from both lamps before the article moves downward sufficiently to allow direct passage of light from the external light source to the eyes of the observer. The circuits for operating the solenoid valves then will be broken and the solenoid exhaust valve will be opened and the solenoid intake valve closed. The air from the cylinder will escape through the lines hereinbefore described to and through the exhaust line.

The light shields may be made of cardboard, light gauge metal or any other suitable material. Each is provided with an aperture intermediate its side edges and extending from the bottom of the light shield upwardly to the desired height. These apertures are cut out to have configurations generally related to that of the article to be inspected and to have widths at any level appropriate for the width of the generally corresponding portion of the article. The aperture in the back light shield should be sufficiently high to permit illumination of the article by the external light source sufficiently to make the article clearly visible to the observer for the full height of the article. At the same time, the upper edge of the aperture 51 in the back shield should be low enough to be below a line, such as the line indicated at 152, Fig. 7, extending from the eye 153 of an observer at the highest observation level tangent both to the upper edge of the aperture 53 in the front shield 54 and to the highest point 154 on the top surface of the insulator 22. The line 155 in Fig. 7 extends from the eye of the observer at the same observation level to the lowest visible point, indicated at 156, on the top or crown surface of the rotating insulator. The upper edge of the aperture in the back light shield should be sufficiently low to preclude a flash of light from the source 47 passing along this line directly to the eye of the observer.

In Fig. 8, the right and left eyes of an observer at an observation station respectively are designated 157 and 158. The line 159 is the line farthest to the left along which light from the external source 47 can pass both the left hand edge 159' of the narrower upper portion, Fig. 10, of the aperture in the back shield 52 and also the left hand edge 160 of the narrower upper portion, Fig. 9, of the aperture in the front shield 54 so as to reach the left eye 158 of the observer. This line must pass, as indicated at 161, through glass of the insulator at the level at which the insulator is narrowest, as at the line 162. A light situation exists at the opposite side of the narrowest portion of the insulator so far as passage of light to the right eye of the observer is concerned. The line 163 in Fig. 8 is that farthest to the right along which light from the source 47 can pass both the right hand side edge 164 of the wider base portion (see Fig. 10) of the aperture in the back shield 52 and the right hand side edge 165 of the corresponding portion (see Fig. 9) of the aperture in the front shield 54 to the right eye 157 of the observer. The line 163 must pass through glass of the wider, skirt portion 166 of the insulator, as indicated at 167, Fig. 8. The side notches 168, Fig. 10, at the bottom of the aperture 51 in the back shield 52 and the like notches 169, Fig. 9, at the bottom of the aperture in the front shield are simply clearance notches or cut-outs for the centering lugs 20—a on the top of the insulator supporting cap and are not openings or passages for light from the source 47 to the eyes of the observer.

The inner light source 72 is, of course, so located that light therefrom, to reach the eyes of the observer, must pass through glass of the insulator.

The illuminated inspection box 39 may be provided with top ventilators, such as those indicated at 171, Fig. 1. A housing 173, Figs. 1, 2, and 3, made of sheet metal or other suitable material, may be provided to surround the upright frame member of the machine and the moving parts carried thereby or adjacent thereto. This housing may be made of suitable sections of suitable size, shape and number. These sections may be retained in place in any suitable known manner. Projecting arms, such as those shown at 174, Figs. 2 and 3, may be provided on the upright frame member 5 and may be attached at their outer ends, as at 175, to sections of the housing to retain them in place.

It will be clear that by use of a device embodying the invention, a dense glass article, such as an amber insulator, can be quickly and thoroughly examined visually for defects, such as stones, in the mass of glass of which the body or wall of the article is composed. The lighting and light shielding features of the invention provide adequate illumination of the article without glare on the eyes of an observer who nevertheless has a good view of all portions of the article.

While I prefer to use both an external light source and an internal light source to illuminate the article as in the illustrative device shown in the drawings and hereinbefore described, it is

I claim:

1. A glass article inspection device comprising an article inspection box having a chamber, said box being open at the front of said chamber to permit a view of the interior thereof and also having a bottom opening through which an article to be inspected may be moved vertically into and out of said chamber, a support for said article movable vertically substantially in line with said bottom opening to move said article between a lower position and an inspection position within said chamber, a light source within said chamber at the rear of the article at the inspection position for illuminating said article, and light shielding means within said chamber between said light source and the open front of the chamber to cut off from the eyes of an observer in front of the inspection box all direct light from the light source not passing through said article and to permit a view of the entire article by the observer.

2. A glass article inspection device comprising a box having top, side and bottom walls and being open at its front, the bottom wall of said box having an opening therein through which a glass article to be inspected may be moved vertically between a lower position and an inspection position within the box, a light source in the box at the rear of the glass article when the latter is at its inspection position, a front light shield and a rear light shield, each comprising a sheet of opaque material extending transversely of the box between the side walls of the latter and of greater height than the article in the box, the back shield being located rearwardly of the vertical axial line of the article and forwardly of the light source and said front shield being located forwardly of the vertical axial line of the article, said front and back shields having cut-outs extending therein from the lower portions of the shields for part of their respective heights and of relative configurations and dimensions to cooperate with each other and with the interposed article to allow illumination of the article by light from said light source and a full view of the illuminated article to the eyes of an observer in front of the inspection box and to prevent passage of all direct light from said light source past the exterior of said article to the eyes of the observer.

3. A glass article inspection device as claimed by claim 2 and, in combination therewith, means for retaining said shields in positions in the box which are individually adjustable fore-and-aft of the box.

4. A glass article inspection device as claimed by claim 2 and, in combination therewith, means for retaining said light source in the box in a position which is adjustable fore-and-aft of the box.

5. Apparatus to aid visual inspection of an open-bottomed hollow glass article, such as an amber glass insulator, comprising a vertically movable, vertically disposed tubular spindle, a cap mounted on said spindle to move therewith, said cap having a substantially flat upper surface on which such an article may stand upright and having an opening in its top beneath the open bottom of the article thereon, a vertically movable piston rod projecting into the lower end of the tubular spindle, means to reciprocate said piston rod vertically, means operatively connecting the spindle and said piston rod to permit the piston rod to be moved vertically independently of the spindle during the first part of each upward stroke of said piston rod and thereafter to move the spindle upwardly with it during the remainder of the upward stroke of the piston rod, a light source mounted on the upper end of said piston rod in position to be raised into the hollow article on said cap by said first part of the upward stroke of the piston, and a second light source located in position to cast light on said article on said cap from a position adjacent thereto when said article is raised by the remainder of the upward stroke of the piston rod.

6. Apparatus according to claim 5 and, in combination therewith, means to cushion the spindle and the parts carried thereby against shocks at the opposite ends of the vertical movements of said spindle.

7. Apparatus according to claim 5 wherein the mounting of said first named light source on the upper end of said piston rod is constructed and arranged to cushion the light source against shocks incident to the vertical movements of the piston rod and to permit a slight overtravel of the light source relative to the piston rod at the ends of the strokes of the piston rod.

8. Apparatus according to claim 5 wherein said tubular spindle is rotatable about its vertical axis and wherein said cap normally rotates with said spindle and may be retained against rotation while the spindle rotates by pressure applied externally to the peripheral surface of the cap, and, in combination therewith, means to rotate said spindle.

9. An inspection device comprising an electric light source occupying a relatively fixed operative position adjacent to and rearwardly of an open-ended hollow dense walled glass article at an inspection station for casting light rays onto the article directly toward the eyes of an observer in front of the article, a second electric light source adapted to be moved through the open end of the article at the inspection station to and from an operative position in the article in the line of rays of light passing from the first light source through said article toward the eyes of the observer, a reciprocatory rod carrying second electric light source, a pressure fluid motor operatively connected to said rod to reciprocate it to move said second light source to and from an operative position in the article at said inspection station, operating means for said light sources, said operating means comprising a normally open circuit including normally open switches and means operable by said rod to close said switches and said circuit when said rod has been moved to the end of its stroke to dispose said second light source in its said operative position, and means to operate said pressure fluid motor, and light shielding means for preventing glare on the eyes of the observer, comprising a sheet of opaque material extending across the light rays from said first light source rearwardly of the vertical axial line of the article and forwardly of said first light source and a second sheet of opaque material parallel to the first sheet and located forwardly of the vertical axial line of the article and adjacent to said article, said sheets having cut-outs therein cooperating with each other and with the interposed article to allow a full view of the illuminated article to the eyes of the observer while preventing passage of all direct light from said first light source past the exterior of said article to the eyes of the observer.

10. An inspection device according to claim 9 wherein said means to operate said pressure fluid motor comprises a pressure fluid supply line and a pressure fluid exhaust line operatively connected to said motor, a normally closed solenoid valve in the supply line, a normally open solenoid valve in the exhaust line, a normally open, manually closable electric switch adjacent to the glass article inspection station, a normally open, foot-closable electric switch suitably located in relation to said manually closable switch to permit operation of either switch selectively by a single operator, and electrical conducting means operatively connecting said switches in parallel and each in series with said solenoid valves so that closing of either switch will close an operating circuit for both said valves.

11. An illuminating inspection device for a hollow dense walled glass article that is open at one end, comprising a support on which such an article may stand on its open end at an inspection station, a light source adjacent to and at the rear of the thus supported article for casting light rays onto the article directly toward the eyes of an observer in front of said article, and light shielding means to prevent glare from said light source on the eyes of the observer while providing him with a good view of the article, said light shielding means comprising a front light shield and a rear light shield, each comprising a sheet of opaque material extending transversely across the path of rays of light from said light source to the eyes of the observer and of greater height and width than said article, said rear light shield being located rearwardly of the vertical axial line of the article and forwardly of the light source and said front shield being located forwardly of the vertical axial line of the article, said rear and front shields having cut-outs therein of relative configurations and dimensions to cooperate with each other and with the interposed article to allow illumination of all the glass of the wall of the article by light from said light source and a full view of the illuminated article to the eyes of the observer while preventing passage of all direct light from said light source past the exterior of said article to the eyes of the observer.

THOMAS D. GREEN.

REFERENCES CITED

The following references are of record in the file of this patent:

UNITED STATES PATENTS

| Number | Name | Date |
|---|---|---|
| 715,393 | Koehler | Dec. 9, 1902 |
| 1,006,455 | Barnes | Oct. 24, 1911 |
| 1,030,422 | Muench | June 25, 1912 |
| 1,204,664 | Jackson | Nov. 14, 1916 |
| 1,539,626 | Bartlett | May 26, 1925 |
| 2,008,567 | Simonton | July 16, 1935 |
| 2,174,848 | Stahmer | Oct. 3, 1939 |

FOREIGN PATENTS

| Number | Country | Date |
|---|---|---|
| 485,712 | Germany | Nov. 5, 1929 |